US008799313B2

(12) United States Patent
Satlow

(10) Patent No.: US 8,799,313 B2
(45) Date of Patent: *Aug. 5, 2014

(54) METHOD AND SYSTEM FOR PROCESSING MEDICAL PROVIDER CLAIM DATA

(75) Inventor: Marcia Satlow, Watertown, CT (US)

(73) Assignee: Hartford Fire Insurance Company, Hartford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/079,043

(22) Filed: Apr. 4, 2011

(65) Prior Publication Data

US 2011/0179048 A1    Jul. 21, 2011

Related U.S. Application Data

(63) Continuation of application No. 10/078,780, filed on Feb. 19, 2002, now Pat. No. 7,921,123.

(60) Provisional application No. 60/269,957, filed on Feb. 20, 2001.

(51) Int. Cl.
| | |
|---|---|
| *G06F 17/30* | (2006.01) |
| *G06Q 40/08* | (2012.01) |
| *G06Q 50/24* | (2012.01) |
| *G06Q 50/22* | (2012.01) |
| *G06F 19/00* | (2011.01) |

(52) U.S. Cl.
CPC .............. *G06F 19/328* (2013.01); *G06Q 40/08* (2013.01); *G06Q 50/24* (2013.01); *G06Q 50/22* (2013.01)
USPC ............................ 707/770; 707/754; 707/705

(58) Field of Classification Search
USPC ................ 707/754, 705, 770; 705/2, 3, 4
See application file for complete search history.

(56) References Cited

U.S. PATENT DOCUMENTS 4,858,121 A * 8/1989 Barber et al. ...................... 705/2
5,557,514 A   9/1996 Seare et al.
(Continued)

FOREIGN PATENT DOCUMENTS

| CA | 2415013 A1 | 6/2004 |
|---|---|---|
| WO | 91/15817 A1 | 10/1991 |
| WO | 01/04821 A1 | 1/2001 |

OTHER PUBLICATIONS

Saha S.; "The New Age Electronic Patient Record System", Biomedical Engineering Conference, Apr. 1995, pp. 134-137.

(Continued)

*Primary Examiner* — Khanh Pham
(74) *Attorney, Agent, or Firm* — Howard IP Law Group, PC

(57) ABSTRACT

A computer system for processing data related to medical insurance has a communications device in communication with a network; a data storage device in communication with the communications device; and a processor in communication with the communications device and the data storage device. The processor is configured to receive, via the communications device, from a first source data indicative of medical provider claims, from a second source data indicative of insurance payments, and from a third source data indicative of medical provider data; identify common information items in said data from said first, second and third sources; and store the received data, in a data storage device, in a database, wherein said data from said first, second and third sources is cross-referenced with regard to said common information items.

25 Claims, 7 Drawing Sheets

(56) References Cited

U.S. PATENT DOCUMENTS

| | | |
|---|---|---|
| 5,619,991 A | 4/1997 | Sloane |
| 5,772,585 A | 6/1998 | Lavin et al. |
| 5,819,228 A | 10/1998 | Spiro |
| 5,835,897 A | 11/1998 | Dang |
| 5,845,254 A | 12/1998 | Lockwood et al. |
| 5,890,129 A | 3/1999 | Spurgeon |
| 5,933,809 A | 8/1999 | Hunt et al. |
| 5,956,690 A | 9/1999 | Haggerson et al. |
| 5,974,389 A | 10/1999 | Clark et al. |
| 5,991,729 A | 11/1999 | Barry et al. |
| 6,035,276 A | 3/2000 | Newman et al. |
| 6,112,183 A | 8/2000 | Swanson et al. |
| 6,283,761 B1 | 9/2001 | Joao |
| 6,324,516 B1 | 11/2001 | Shults et al. |
| 6,341,265 B1 | 1/2002 | Provost et al. |
| 6,343,271 B1 | 1/2002 | Peterson et al. |
| 6,438,533 B1 * | 8/2002 | Spackman et al. .............. 706/45 |
| 6,529,876 B1 | 3/2003 | Dart et al. |
| 6,611,846 B1 | 8/2003 | Stoodley |
| 6,655,583 B2 | 12/2003 | Walsh et al. |
| 6,757,898 B1 | 6/2004 | Ilsen et al. |
| 6,792,410 B1 | 9/2004 | Donovan et al. |
| 6,826,536 B1 | 11/2004 | Forman |
| 6,879,959 B1 | 4/2005 | Chapman et al. |
| 6,886,016 B2 | 4/2005 | Hansen et al. |
| 6,915,265 B1 | 7/2005 | Johnson |
| 6,915,266 B1 | 7/2005 | Saeed et al. |
| 6,957,218 B1 | 10/2005 | Wyatt |
| 7,389,245 B1 * | 6/2008 | Ashford et al. .................... 705/2 |
| 7,739,123 B1 * | 6/2010 | Rappaport ........................ 705/2 |
| 2001/0016872 A1 | 8/2001 | Kusuda |
| 2002/0007284 A1 | 1/2002 | Schurenberg et al. |
| 2002/0019754 A1 | 2/2002 | Peterson et al. |
| 2002/0035529 A1 | 3/2002 | Tooke, III |
| 2002/0077869 A1 | 6/2002 | Doyle et al. |
| 2002/0111833 A1 | 8/2002 | Dick |
| 2002/0148893 A1 | 10/2002 | Walsh et al. |
| 2002/0188467 A1 | 12/2002 | Eke |
| 2002/0198741 A1 | 12/2002 | Randazzo |
| 2003/0046107 A1 | 3/2003 | Eisenberg et al. |
| 2003/0083903 A1 | 5/2003 | Myers |
| 2003/0093366 A1 | 5/2003 | Halper et al. |
| 2003/0120516 A1 | 6/2003 | Perednia |
| 2004/0260577 A1 | 12/2004 | Dahlin et al. |
| 2005/0187797 A1 * | 8/2005 | Johnson ........................... 705/3 |

OTHER PUBLICATIONS

Foran, D. J. et al.; "A Distributed Health Information Network for Consultative Services in Surgical Pathology"; IEEE 17th Annual Conference in Engineering in Medicine and Biology Society 1995; vol. 1, pp. 20-25.

Practice 2000 for Medical & Dental Practices, Abaki Pty. Ltd.; 1994-2003; 13 Pages.

* cited by examiner

METHOD AND SYSTEM FOR PROCESSING MEDICAL PROVIDER CLAIM DATA

CROSS REFERENCE TO RELATED APPLICATIONS

This application is a continuation application of co-pending U.S. patent application Ser. No. 10/078,780 entitled METHOD AND SYSTEM FOR PROCESSING PHYSICIAN CLAIMS OVER A NETWORK, filed Feb. 19, 2002, which application claims priority to and benefit of U.S. Provisional Patent Application No. 60/269,957 entitled NETWORK PHYSICIAN CLAIM PROFILING TOOL, filed Feb. 20, 2001, the entire contents of all of which are herein incorporated by reference for all purposes.

FIELD OF THE INVENTION

The present invention relates to processing insurance claims over a network and more specifically to processing physician claims to provide proper reimbursement.

BACKGROUND OF THE INVENTION

A majority of people today use medical insurance to pay for treatment at a plurality of medical providers, such as, doctors, HMOs and medical centers. Medical providers, in turn, then submit detailed invoices to one or more designated insurance companies that are obligated to pay for the services provided. Because of the volume of invoices received and the insurance companies' need to verify that the invoices contain treatments that the company is obligated to pay, there is significant delay in reconciling the patients account and paying the medical provider. Further, when a patient has multiple insurance coverage, e.g., MEDICAID, MEDICARE, private health insurance, there is a need to insure that each insurance provider fulfills their required obligation for payment and to prevent each insurance provider from returning a full payment to the medical provider or patient.

Hence, there is a need for a system that monitors and reconciles the patients' treatments and medical services provided to insure that proper and rapid reimbursement of medical services is returned to the medical provider or patient.

SUMMARY OF THE INVENTION

A method and system for gathering, collating and sorting information items distributed among a plurality of databases containing information items regarding physician treatment/billing claims, insurance payments, and provider/patient relations over at least one communication networks is disclosed. The method comprises the steps of creating an intermediate data base containing information items related to physician treatment/billing claim data, insurance payment data, and insurance provider. The information items are further cross-referenced with regard to at least one common information item. The information items in the intermediate data base are then filtered using at least one selected information item contained in the intermediate data base to create at least one file containing cross-referenced data items relating to the filtering criteria, and reporting a selected one of the file. In another aspect of the invention, the created files may be selectively filtered using additional filter criteria.

Figure 1:
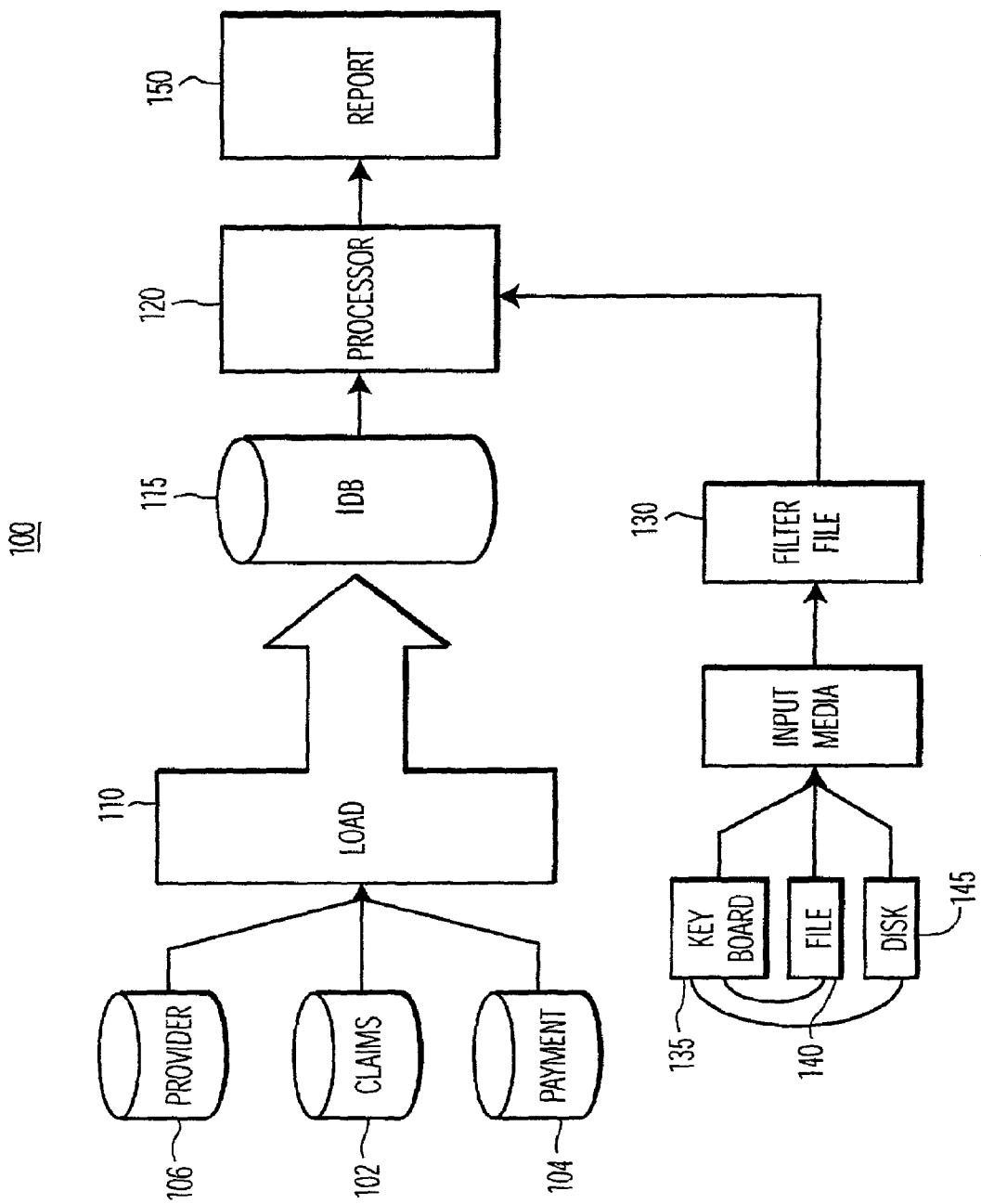
FIG. 1 illustrates a block diagram of an exemplary process flow in accordance with the principles of the invention.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE INVENTION

FIG. 1 illustrates a block diagram of an exemplary process 100 in accordance with the principles of the present invention. In this process 100, information items contained on first database 102, representative of physician or medical provider claims, are provided or applied to load module 110. Similarly, information items contained on second database 104 and third database 106, representative of payment or invoice data and provider data, respectively, are provided or applied to load module 110. Load module 110, as will be more fully explained, operates on the provided or applied information items to produce intermediate database 115 (DB). Intermediate database 115 contains information items that are cross-linked or cross-referenced to corresponding claim information items, payment information items and provider information items contained in databases 102, 104, and 106 respectively. The cross-referenced information items are then applied to processor 120 for subsequent analysis and operations. Processor 120 also receives input values from filter file 130, which are used to determine the analysis and operations performed on the provided cross-referenced data or information items. Processor 120 then selects and retains those information items, and corresponding cross-referenced information items, that match the input values or operations designated by filter file 130. The output of processor 120 may then be reported as report 150 or displayed on a display (not shown), such as a computer CRT monitor, LCD or LED display.

Filter file 130 may include values or operations that are entered via an input media, which is illustrated as keyboard 135, a file 140, magnetic medium such as a disk 145, or a memory (not shown). As would be appreciated, keyboard 135 may also be used to enter input values into file 140 or disk 145.

Figure 2:
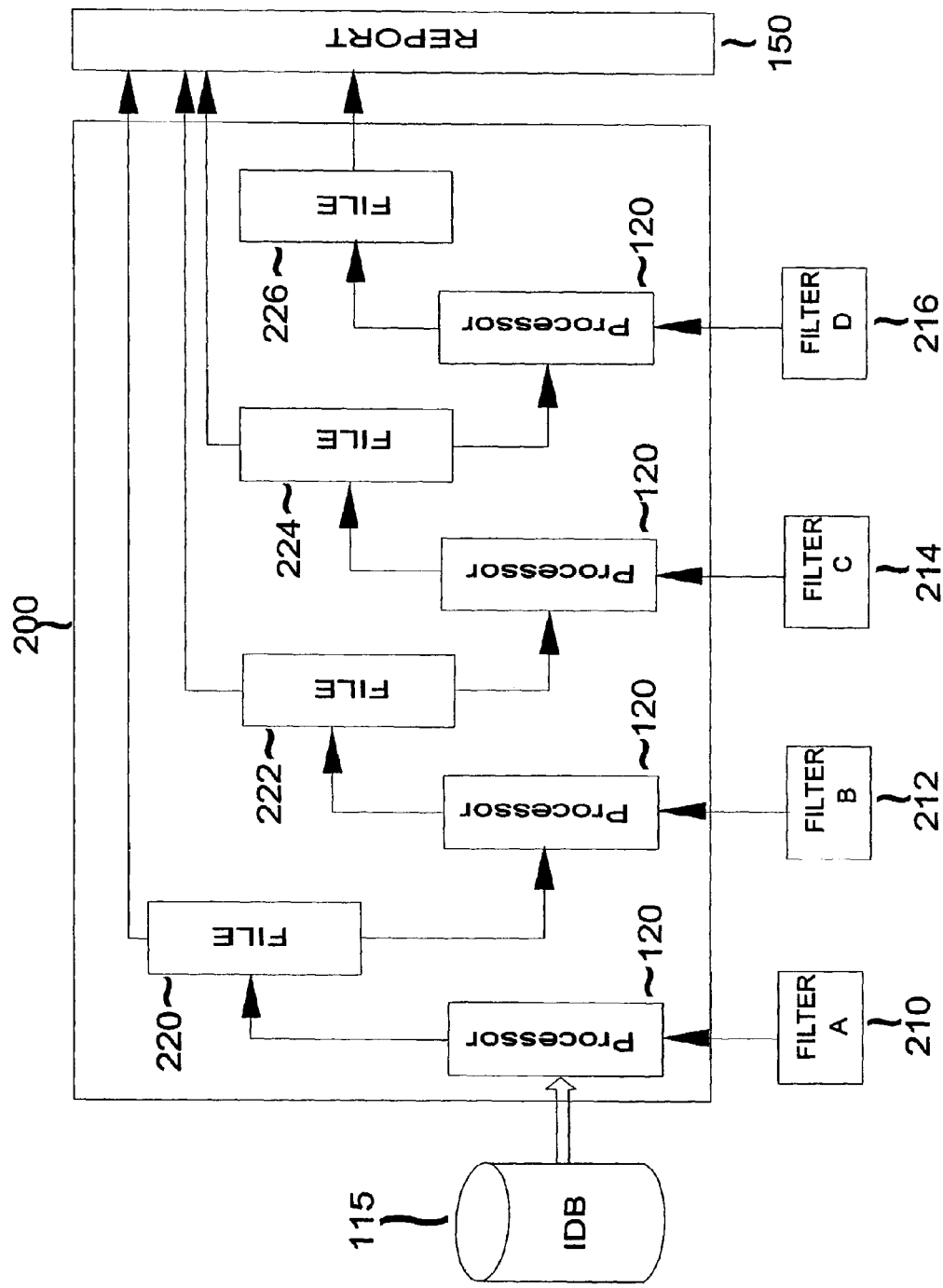
FIG. 2 illustrates a block diagram of an exemplary processing in accordance with the principles of the invention.

FIG. 2 depicts a block diagram of an exemplary process 200 of iteratively managing physician, claim, provider, etc., data or information items in accordance with the principles of the present invention. In this illustrative example, information items contained on IDB 115 and filter data items, represented as first filter 210, entitled Filter A are provided to processor 120. The information items of IDB 115 matching the criteria of Filter A 210 are then stored in a corresponding file 220. In a second level of filtering, data or information items in selected file 220 and filter data items in second filter 212, represented as Filter B are again applied to processor 120. In this case, information items matching the criteria of second filter 212 are stored in corresponding file 222. In a third level of filtering, information items contained in selected file 222 and filter data items in third filter 214, represented as Filter C, are again applied to processor 120. Those information items matching the criteria of filter 214 are stored in corresponding file 224. At a fourth level of filtering, the information items contained in selected file 224 and filter data items of fourth filter 216, represented as Filter D are applied to processor 120. Those information items matching the criteria contained in filter 216 are stored in file 226. Thus, in this illustrated process, file 226 contains those information items of IDB 115 that match the criteria of Filter A 210, Filter B 212, Filter C 214 and Filter D 216. Each of the files 220, 222, 224, 226 may then be selectively available for reporting as report 150 or viewing on a display (not shown). As an example of the operations performed by the illustrated process 200, file 220 may contain information regarding all claims for the year of 2000, file 222 may contain information regarding all claims relating to a particular medical ailment in the year 2000, file 224 may contain information regarding all claims relating to a particular ailment in a specified area or region in the year 2000 and file 226 may contain information regarding a specific treatment relating to a particular ailment in a specified region in the year 2000. As would be appreciated, a similar analysis may be performed in another year by selecting different matching criteria for Filter A 210. An analysis of a most-often-used treatment type, for example, may similarly be determined by selecting different matching criteria for Filter D 216. Furthermore, although four levels of subsequent filtering are illustrated, it would be appreciated that any number of levels of filtering may be achieved by the removal or addition of filter data and are contemplated to be within the scope of the invention.

Figure 3:
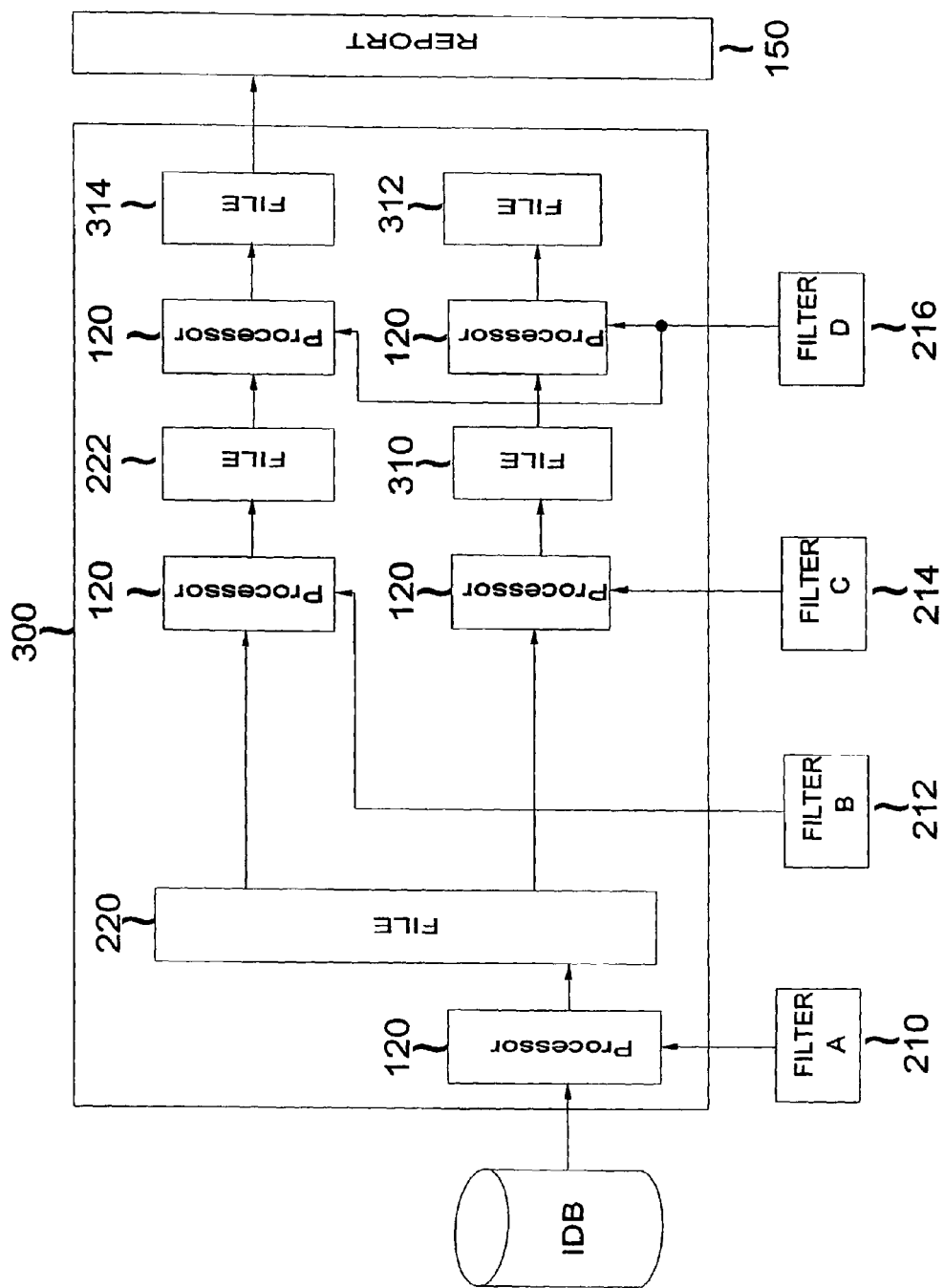
FIG. 3 illustrates a block diagram of a second exemplary processing in accordance with the principles of the invention.

FIG. 3 illustrates a block diagram of a second exemplary process 300 for iteratively managing physician, claim, insurance, provider, etc., data in accordance with the principles of the invention. In this exemplary process, information items stored on IDB 115 and filter items within first filter 210, represented as Filter A, are applied to processor 120. Those information items matching the criteria of Filter A 210 are stored in file 220. In a second level of filtering, information items stored in selected file 220 and filter criteria items within second filter 212, represented as Filter B, are applied to processor 120. Those information items matching the criteria of Filter B 212 are stored in file 222. Sequentially or concurrently, information items stored in selected file 220 and filter criteria items within third filter 212, represented as Filter C, are applied to processor 120. Those information items matching the criteria of Filter C 214 are stored in file 310. As a third level, information items stored in selected file 222 are filtered using fourth filter 216, represented as Filter D. Those information items in selected file 222 matching the criteria of Filter D 216 are stored in file 314. Sequentially or concurrently, information items stored in selected file 310 are filtered using fourth filter 216. Those information items in selected file 310 matching the criteria of Filter D 216 are, in this case, stored in file 312. File 312, thus, contains information items representative of information items within IDB 115 matching criteria selected by Filters A, C and D, while file 314 includes information items representative of information items within IDB 115 matching criteria selected by Filters, A, B and D. Each of the files 220, 222, 310, 314 and/or 314 may be selected for viewing at report 150.

Figure 4:
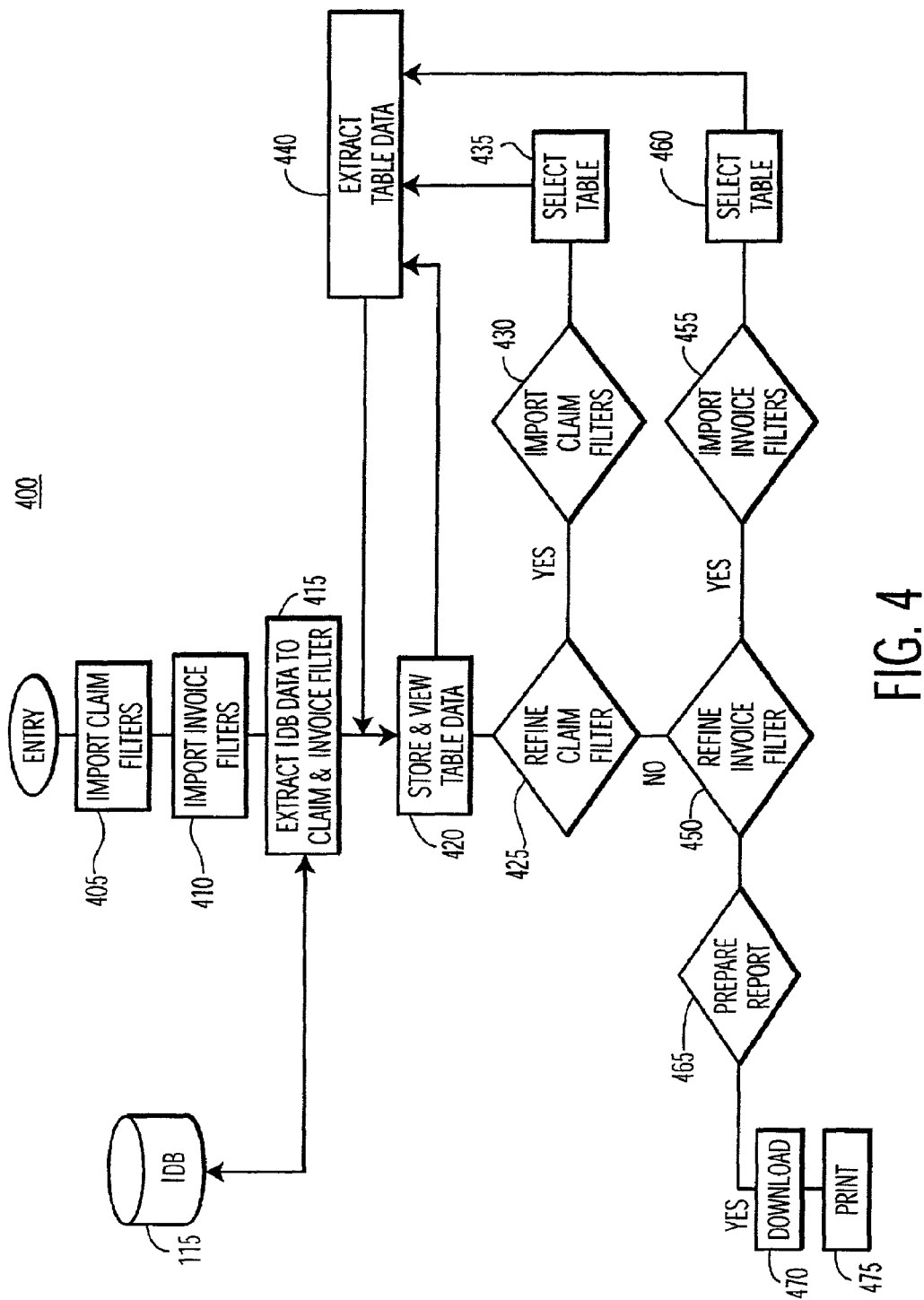
FIG. 4 illustrates a flow chart of an exemplary processing shown in FIG. 1.

FIG. 4 illustrates a flow chart of an exemplary process 400 wherein information items within IDB 115 are extracted and filtered using filtering criteria related to both claim number and invoice number. Although FIG. 4 illustrates the use of two-dimensional filtering it would be appreciated that any parameter or information item or any number of parameters or information items or any range associated with any parameters contained in IDB 115 may be used as filtering criterion.

In this illustrative example, a claim number is input to or imported into process 400 at block 405 (import claim number). Similarly, at block 410 (import invoice number), an invoice number is input to or imported into process 400. At block 415 (extract IDB data to claim and invoice filter) IDB 115 is then accessed to identify and extract information items that match the inputted or imported claim number and invoice number filter criteria. Information items that are cross-referenced to the matched information items are also identified and extracted. The extracted information items or data are stored in a table or file. In a preferred embodiment, the extracted information items are stored in a table or file that is suitable for further filter processing at block 420. In a most preferred embodiment of the invention, the extracted information items and the associated cross-referenced extracted information items are in a format similar to that of an initial file stored in IDB 115. In this manner, process 400 may access and filter selected tables or files without any changes or modifications.

At block 425 (refine claim) a determination is made whether the claim number filter information requires refinement to extract more specific information items. If the answer is in the affirmative, then at block 430, at least one additional claim filter criterion information item is inputted or imported. At block 435 (select table) a file or table is selected from which information items matching the additional claim filter criterion are extracted. At block 440 (extract table data), information items matching, in this example, initial and additional claim filter criteria and initial invoice filter criteria are extracted from the selected table or file. As would be appreciated, IDB 115 may also be selected. This process of refinement of the claim number information may be iteratively continued until no information items matching the refined filtering criteria are extracted.

Returning to the determination at block 425, if the answer is in the negative then at block 450 (refined invoice) a determination is made whether the inputted invoice filter criteria requires refinement. If the answer is in the affirmative, then at block 455 (import invoice filters), additional invoice filter criteria information are inputted or imported. At block 460 (select table), a file or table is selected from which information items matching the additional invoice filter criteria are extracted. At block 440 (extract table data), information items matching, in this example, initial claim filter criteria and initial and additional invoice filter criteria are extracted from a selected table or file. This process of refinement of the invoice number information may be iteratively continued until no information items matching the refined filtering criteria are extracted.

If the answer at block 450 is in the negative, then at block 465 (prepare report) a determination is made whether a report is to be prepared. If the answer is in the affirmative, then in one aspect of the invention, at block 470 (download) the report prepared may be downloaded, over a network, for example, and/or may be printed at block 475 (print). In another aspect of the invention, the report may be displayed on a computer monitor, for example.

Figure 5:
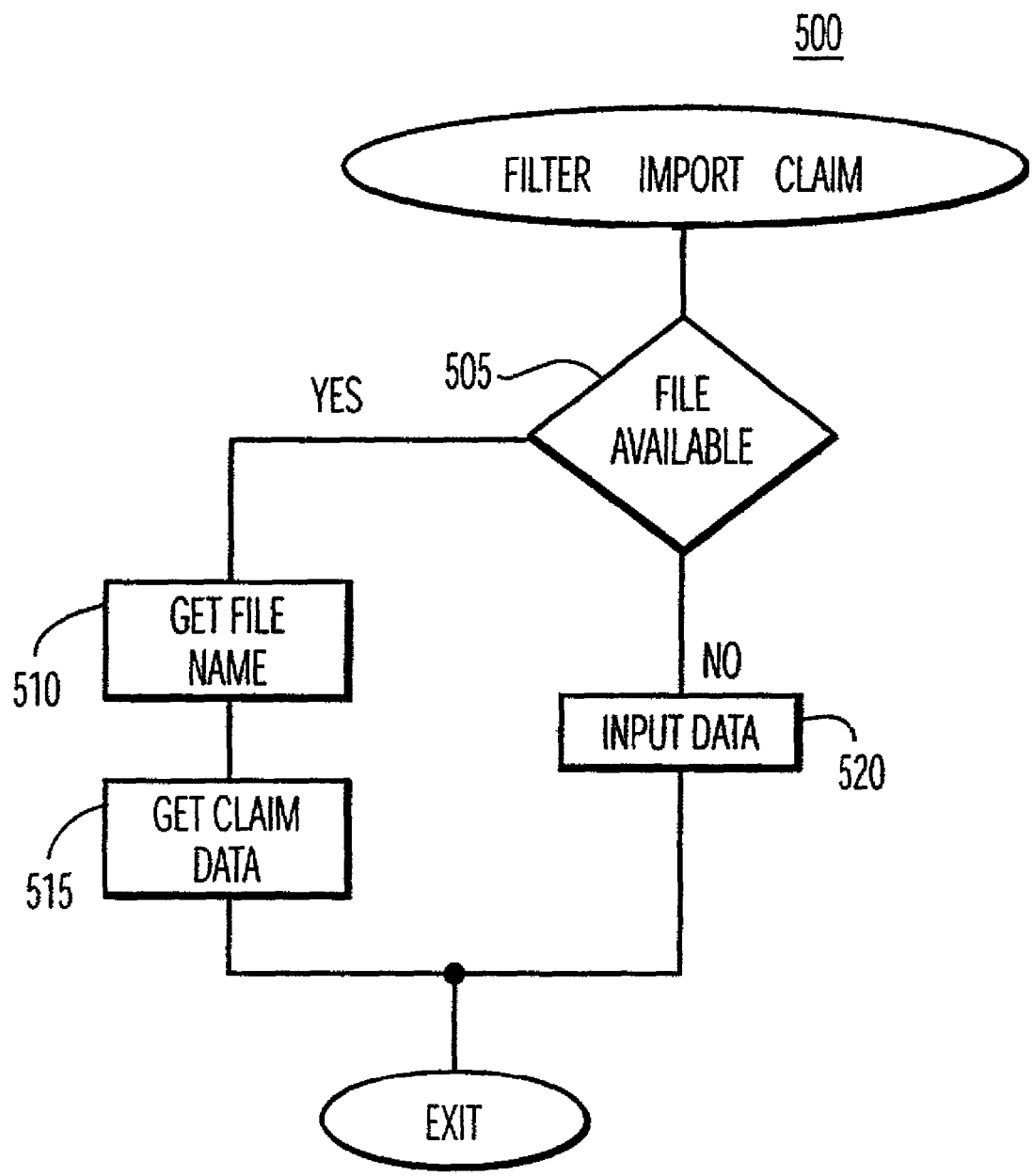
FIG. 5 illustrates a flow chart of an exemplary process for determining filter settings in accordance with the principles of the invention.

FIG. 5 illustrates a flow chart of an exemplary process 500 for inputting or importing filter criteria information. Although process 500 illustrates processing for inputting or importing information regarding extracting claim information from IDB 115 or a selected file or table, it would be appreciated that similar processing may be used for inputting or importing information regarding filtering or extracting information items associated with any other parameter, parameters or parameter range contained within IDB 115 or subsequent tables or files.

In this exemplary process illustrated, a determination is made at block 505 (file available) whether filter criteria information regarding a claim filter having desired filtering characteristics is available. In one aspect of the invention, filtering criteria or information items used for filtering of "often-used-values" may be stored in one or more databases or files. This prestored filter information may be stored locally or may be accessed over a network. Prestoring information items is well known in the art and need not be discussed in detail herein.

If the answer, at block 505, is in the affirmative, then at block 510, (get name of file) the name of the file or database containing the desired filter information or criteria is input, imported or obtained. A file name may be manually entered or obtained by selecting a name from a list of files. At block 515 (get claim data) filter criteria data associated with the filter file name is obtained.

If, however, the determination at block 505 is in the negative, then data corresponding to filter criteria may be input at block 520 (input data). In one aspect, filter criteria data may be manually input from an input device such as a keyboard. The input data may also be stored in the filter file located on a database, magnetic or optical disk drive, permanent or semi-permanent memory, etc.

Figure 6:
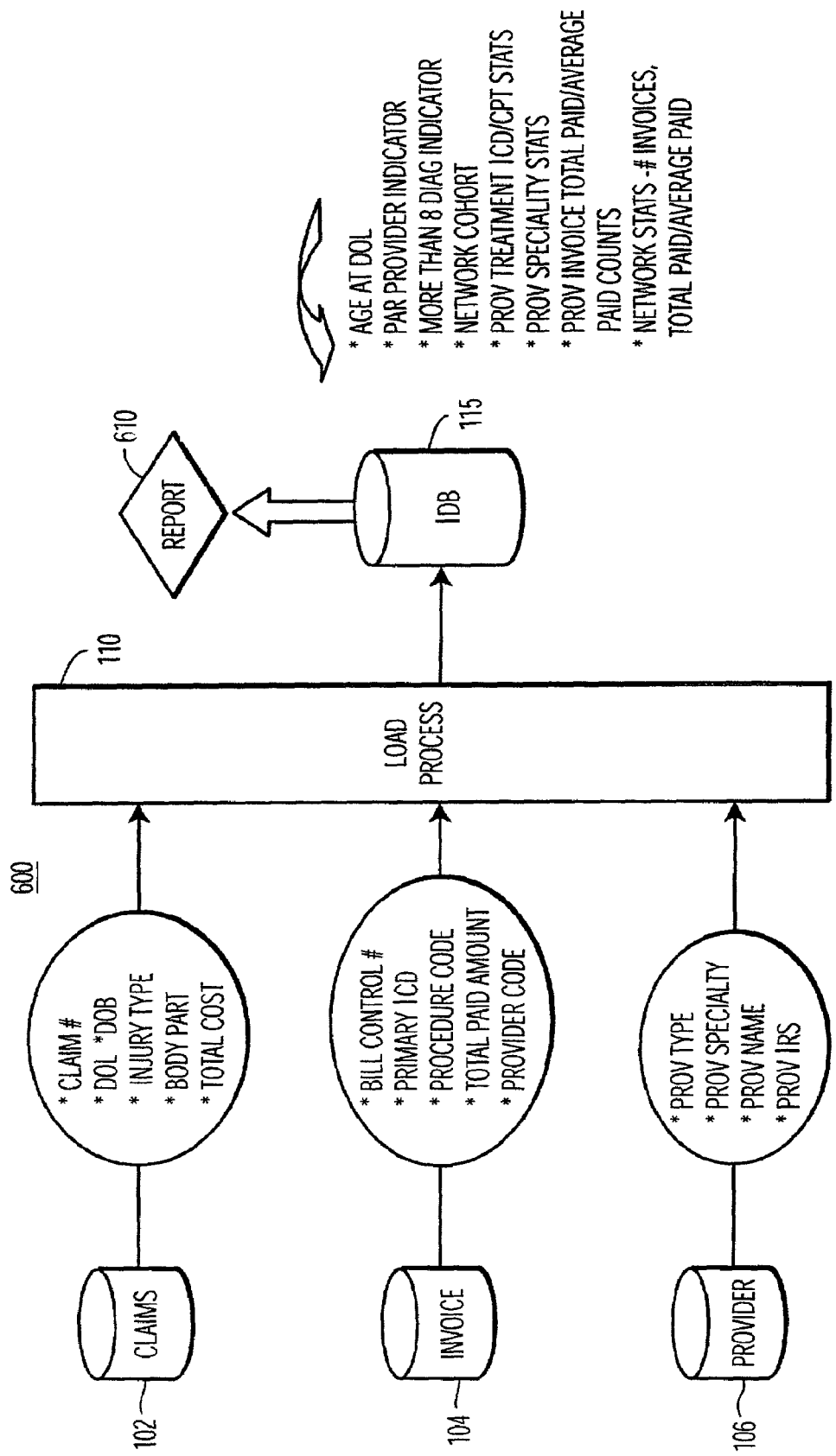
FIG. 6 illustrates a block diagram of an exemplary process for creating an intermediate data base in accordance with the principles of the present invention.

FIG. 6 illustrates a block diagram of exemplary process 600 for creating an IDB 115 from at least one database containing information items related to physician claims, invoices/payments and provider/patient relations. In this illustrative example, information items from claims database 102, such as claim number, Date of Loss, Date of Birth, Injury Type, body part, total cost, etc., are input or applied to load process 110. Serially or concurrently, in time, information items, such as bill control number, primary ICD, procedure code, etc., from invoice database 104 are input to or applied to load process 110. Serially or concurrently, in time, information items, such as provider type, provider specialty, etc., from provider database 106 are input or applied to load process 110. Load process 110 then organizes the provided information items, such that information items are cross-referenced to corresponding information items among the illustrated data providing databases 102, 104, and 106 using at least one common information item. For example, claim database 102 may contain a physician's claim for services performed on a patient. The claim may include identification information items, such as social security number, medical group number, insurance provider, etc., in addition to the patient's name, a diagnosis, diagnosis classification code, treatment, treatment code, amount for services rendered etc. The provider database 106 may include information items such as patients' names, social security numbers, names of treating physicians and payment values. The provider database 106 may also include information items regarding the payment and treatment schedule that have been provided by the provider for each patient. Hence, load process 110 may cross-link or reference a claim regarding a specific patient with a provider based on at least the provider identification code. The provider information may further be cross-linked to a treatment schedule based on at least the patients identification code.

In creating IDB 115, load process 110, in one aspect of the invention, may validate each of the information items contained in each of the databases providing information items. In this aspect, selected information items may be compared to predetermined or known ranges. When an information item is detected outside a corresponding known range, then a known default value may be entered into the corresponding field in IDB 115. The known default value may be automatically entered, or a prompt may be made for a user to enter at least one known information value. For example, diagnosis codes, which are based on the well known code system, and contained within claims database 102 may be validated against a range of diagnosis codes. In this aspect of the invention, when a diagnosis code is determined not to be within a valid range, then a known default value may be dynamically entered in the field corresponding diagnosis code.

Load process 110 may further create at least one composite information item that is not contained in any of the databases providing information items. For example, load process 110 may compare the treating physician's name or identification number in an entry within claims database 102 with lists of physician's names or identification numbers located in a provider's database 106 to determine whether a physician submitting a claim or claims is within a network of physicians that participate in the provider's plan. If the determination is in the affirmative, then an indication that signifies the status of the physician within the provider's plan may be placed in a new field in IDB 115. Otherwise, a second indication may be placed in the new field in IDB 115 to indicate the physician is not within the provider's plan.

Figure 7:
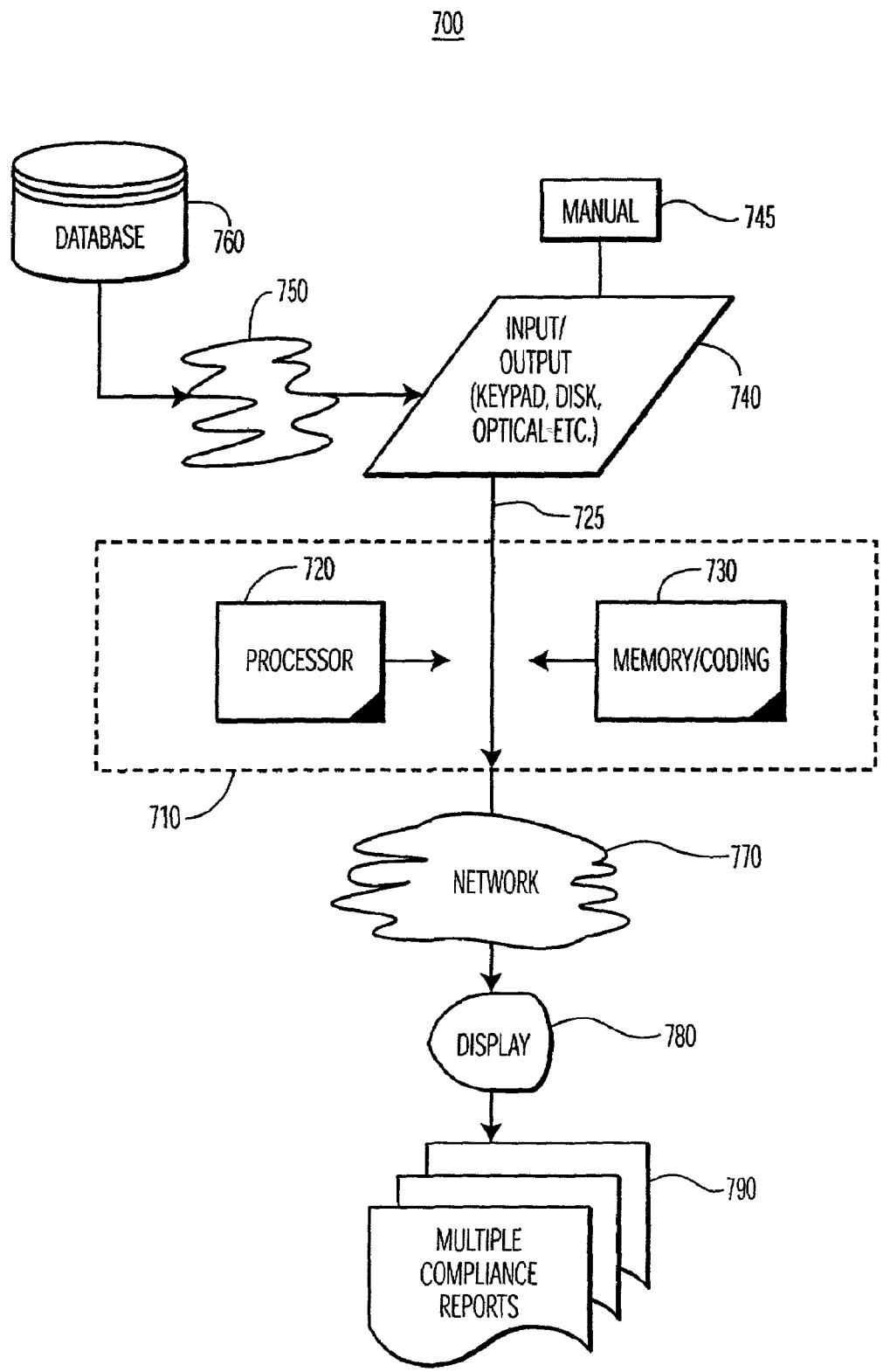
FIG. 7 illustrates a system operable to execute the exemplary processing illustrated in FIG. 4.

FIG. 7 illustrates an exemplary system 700 for practicing the principles of the invention. In this exemplary system embodiment, input data is received over network 750 and is processed in accordance with one or more software programs executed by processing system 710. The results of processing system 710 may then be transmitted over network 770 for viewing on display 780 and/or reporting at 790.

System 700 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 750 and 770 may be an internal network, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

One or more input/output devices 740 receive data from the illustrated database 760 over network 750 and the received data is applied to processing system 710. Processing system 710 comprises processor 720, which is in communication with input/output device 740 and memory 730. Input/output devices 740, processor 720 and memory 730 may communicate over a communication medium 725. The communication medium 725 may represent, for example, an ISA, a PCI, a PCMCIA bus, a communication network, one or more internal connections of a circuit, circuit card or other device, as well as portions and combinations of these and other communication media. Processor 720 may be representative of a handheld calculator, special purpose or general purpose processing system, desktop computer, laptop computer, palm computer, or personal digital assistant (PDA) device etc., as well as portions or combinations of these and other devices that can perform the operations illustrated in FIG. 4. Processor 720 may include code, which when executed, performs the operations illustrated in FIG. 4. The code may be contained in memory 730 or read/downloaded from a memory medium such as a CD-ROM or floppy disk (not shown), which is accessible by processor 720, when needed. The operations illustrated in FIG. 4 may be performed sequentially or in parallel using different processors to determine specific values. Further, the data received by input/output device 740 may be immediately accessible by processor 720 or may be stored in memory 730. As will be appreciated, input/output device 740 may also allow for manual input, such as a keyboard or keypad entry or may read data from magnetic or optical medium.

In other embodiments, hardware circuitry may be used in place of, or in combination with, software instructions to implement the invention. For example, the elements illustrated herein may also be implemented as discrete hardware elements or may be integrated into a single unit.

While there has been shown, described, and pointed out, fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated.

What is claimed is:

1. A computer-implemented method for processing data related to medical insurance, comprising:
    receiving by a processor from a first source data indicative of medical provider claims submitted to insurance providers, including claim number data, injury type data and provider identification data, from a second source data indicative of insurance payments made by insurance providers to medical providers, including bill control number, procedure code and provider identification data, and from a third source data indicative of medical provider data, including provider identification data;
    identifying by the processor common information items, comprising at least provider identification data, in said data from said first, second and third sources;
    storing by the processor the received data in a data storage device in an intermediate database, wherein said data from said first, second and third sources is cross-referenced with regard to at least said provider identification data of said common information items;
    determining by the processor, based on data from at least two of said first, second and third sources, at least one data item not contained in any of said data from said first, second and third sources; and
    storing by the processor the determined at least one data item in the intermediate database.

2. The computer-implemented method of claim 1, further comprising filtering the data stored in said intermediate database using at least one selected information item to create output data containing cross-referenced data items relating to said at least one selected filtering information item; and
    storing the created output data containing the cross-referenced data items in said intermediate database in the data storage device.

3. The computer-implemented method of claim 2, further comprising preparing a report containing the cross-referenced data items, and printing the report.

4. The computer-implemented method of claim 3, further comprising filtering the cross-referenced data items to create output data containing an additional cross-referenced data item relating to at least one additional information item, and preparing a report containing the additional cross-referenced data.

5. The computer-implemented method of claim 4, further comprising repeating the filtering the cross-referenced data items to create output data containing an additional cross-referenced data item relating to at least one additional information item and the preparing a report containing the additional cross-referenced data, until no data items matching the additional information item employed as a filtering criterion is identified.

6. The computer-implemented method of claim 2, wherein the filtering further comprises: importing a claim number filter, importing an invoice number filter, extracting data from the intermediate database based on the imported claim number filter and the imported invoice number filter, storing resulting data, importing a refined claim number filter, importing a refined invoice number filter, applying the imported refined claim number filter and refined invoice number filter to the stored resulting records, and storing the data resulting from the application of the refined claim number filter and the refined invoice number filter.

7. The computer-implemented method of claim 1, wherein the receiving comprises receiving the data via a communications network in communication with the processor.

8. The computer-implemented method of claim 1, wherein the data indicative of medical provider claims comprises date of loss data, injury type data and total cost data.

9. The computer-implemented method of claim 8, wherein the data indicative of insurance payments comprises procedure code data, total paid amount data and provider code data, and the data indicative of medical provider data comprises provider type data and provider specialty data.

10. The computer-implemented method of claim 1, wherein the determining by the processor based on said data from at least two of said first, second and third sources, at least one data item not contained in any of said data from said first, second and third sources, comprises comparing physician data from the first source with physician data from the third data source, the third data source being associated with a provider, to determine whether a physician submitting a claim is within a network of physicians that participate in a plan of the provider.

11. The computer-implemented method of claim 1, wherein the storing by the processor the received data in a data storage device in the intermediate database further comprises comparing received diagnosis codes in data indicative of medical provider claims from the first source to a range of diagnosis codes, and responsive to determining that a received diagnosis code is not within a valid range, entering a default value in a field corresponding to the diagnosis code in the intermediate database.

12. A computer system for processing data related to medical insurance, comprising:
    a communications device in communication with a network;
    a data storage device in communication with the communications device; and
    a processor in communication with the communications device and the data storage device, and configured to:
    receive, via the communications device, from a first source data indicative of medical provider claims submitted to insurance providers, including claim number data, injury type data and provider identification data, from a second source data indicative of insurance payments made by insurance providers to medical providers, including bill control number, procedure code and provider identification data, and from a third source data indicative of medical provider data, including provider identification data;

identify common information items, comprising at least provider identification data, in said data from said first, second and third sources;

store the received data, in an intermediate database stored in the data storage device, wherein said data from said first, second and third sources is cross-referenced with regard to at least said provider identification data of said common information items;

determine based on data from at least two of said first, second and third sources, at least one data item not contained in any of said data from said first, second and third sources; and store the determined at least one data item in the intermediate database.

13. The computer system of claim 12, wherein the processor is further configured to:

filter the stored data using at least one selected information item contained in said intermediate database to provide output data indicative of cross-referenced data items relating to said at least one selected information item; and store the data indicative of the cross-referenced data items in said intermediate database stored in the data storage device.

14. The computer system of claim 13, further comprising a display in communication with the processor, the processor further configured to provide the data indicative of the cross-referenced data items to the display for display to a user.

15. The computer system of claim 14, wherein the data indicative of medical providers further comprises data relating to treatment schedules.

16. The computer system of claim 14, wherein the selected information item comprises claim number criteria.

17. The computer system of claim 14, wherein the processor is further configured to compare data items from one of said sources with data items from another one of said sources to create composite information items.

18. The computer system of claim 17, wherein the processor is further configured to compare medical provider data associated with one of said plurality of claims from said first source, with data indicative of medical provider participation in a plan from said third source, determine whether the medical provider participates in the plan, and store in the data storage device a composite information item in the form of an indication of whether the medical provider participates in the plan.

19. The computer system of claim 18, wherein, responsive to the determination that the medical provider does not participate, the composite information item stored in the data storage device is an indication that the medical provider does not participate in the plan.

20. The computer system of claim 12, wherein the data indicative of medical provider claims comprises, for each of a plurality of claims, claim number, patient data, insurance provider data, medical provider data, diagnosis data, treatment data and amount of claim data; and the data indicative of insurance payments comprises a procedure code, a provider code and a total paid amount; and the data indicative of medical providers comprises provider identification data, provider type and patient data.

21. A non-transitory computer-readable medium having processor-executable instructions stored thereon, which instructions, when executed by a processor, cause the processor to:

receive, via a communications device, from a first source data indicative of medical provider claims submitted to insurance providers, including claim number data, injury type data and provider identification data, from a second source data indicative of insurance payments made by insurance providers to medical providers, including bill control number, procedure code and provider identification data, and from a third source data indicative of medical provider data, including provider identification data from a second source data indicative of insurance payments made by insurance providers to medical providers, and from a third source data indicative of medical provider data;

identify common information items, comprising at least provider identification data, in said data from said first, second and third sources;

store the received data, in a data storage device, in an intermediate database, wherein said data from said first, second and third sources is cross-referenced with regard to at least said provider identification data of said common information items;

filter the data stored in said intermediate database using a first filter comprising at least a first selected information item to create first output data containing cross-referenced data items relating to said at least one selected filtering information item;

filter the first output data using at least a second filter, the second filter comprising at least a second selected information item, to create second output data containing cross-referenced data items;

determine based on data from at least two of said first, second and third sources, at least one data item not contained in any of said data from said first, second and third sources; and store the determined at least one data item in the intermediate database.

22. The non-transitory computer-readable medium of claim 21, wherein the instructions, when executed by the processor, further cause the processor to:

filter the stored data using at least one selected information item contained in said intermediate database to provide output data indicative of cross-referenced data items relating to said at least one selected information item; and store in said intermediate database the data indicative of the cross-referenced data items.

23. The non-transitory computer-readable medium of claim 22, wherein the data indicative of medical provider claims comprises, for each of a plurality of claims, claim number, patient data, insurance provider data, medical provider data, diagnosis data, treatment data and amount of claim data; and the data indicative of insurance payments comprises a procedure code, a provider code and a total paid amount; and the data indicative of medical providers comprises provider identification data, provider type and patient data.

24. The non-transitory computer-readable medium of claim 23, wherein the selected information items comprise claim number and invoice number.

25. The non-transitory computer-readable medium of claim 22, wherein the instructions further cause the processor to prepare a report including the data indicative of the cross-referenced data items, and to permit the report to be downloaded over a network.

\* \* \* \* \*